United States Patent Office
3,691,078
Patented Sept. 12, 1972

3,691,078
OIL COMPOSITIONS CONTAINING ETHYLENE COPOLYMERS
Thomas Emmett Johnston and Earl Eugene Sommers, Wilmington, Del., assignors to E. I. du Pont de Nemours and Company, Wilmington, Del.
No Drawing. Continuation-in-part of abandoned application Ser. No. 785,346, Dec. 19, 1968. This application Nov. 25, 1969, Ser. No. 879,902
Int. Cl. C10m 1/18
U.S. Cl. 252—59       6 Claims

ABSTRACT OF THE DISCLOSURE

Improved mineral oil compositions comprising a neutral, non-volatile, mineral oil, a pour point depressant and a viscosity index improver consisting of an oil-soluble, substantially linear, hydrocarbon copolymer containing 25 to 55 weight percent polymerized ethylene units and 75 to 45 weight percent polymerized comonomer units, said comonomer selected from the group consisting of terminally unsaturated straight chain monoolefins of 3 to 12 carbon atoms, $\omega$-phenyl-1-alkenes of 9 to 10 carbon atoms, 2-norbornene, terminally unsaturated non-conjugated diolefins of 5 to 8 carbon atoms, dicyclopentadiene, 5-methylene-2-norbornene, and mixtures thereof, said copolymer having a pendent index of about 18 to 33, an average pendent size not exceeding 10 carbon atoms, an average chain length of 2,700 to 8,800 carbon atoms and an inherent viscosity of about 0.7 to 1.8 as measured on a 0.1 weight percent solution in tetrachloroethylene at 30° C.

CROSS-REFERENCE TO RELATED APPLICATION

This is a continuation-in-part of copending application Ser. No. 785,346, filed Dec. 19, 1968, now abandoned.

BACKGROUND OF THE INVENTION

It is well known that mineral lubricating oils and functional fluids have a tendency to become thin at elevated temperatures while becoming thick at low temperatures, and thus it is generally necessary to incorporate additives which improve their viscosity-temperature relationships. For example, in the case of a crankcase lubricating oil in a cold engine, it is desirable that the oil not become so thick that it is difficult to start the engine. On the other hand, when the engine is hot, it is necessary that the oil be sufficiently viscous that an oil film is maintained between the moving parts.

The viscosity-temperature relationship of an oil at temperatures in the range of 100° to 210° F. is known as its viscosity index. Thus, additives which retard the tendency of the oil to thin as the temperature is raised from 100° to 210° F. are known as viscosity index improvers. The viscosity index improvers which are most widely used at the present time are polymers of methacrylate esters having long alkyl chains and polyisobutylene polymers.

One of the most important considerations from a commercial standpoint in evaluating viscosity index improvers is the thickening power of the additive, that is, the amount of additive necessary to give the desired thickening at 210° F. Since these additives are considerably more expensive than the oil to which they are added, the amount of additive required has a significant effect upon the price of the resulting oil composition. The thickening power of polymeric viscosity index improvers generally increases with increased molecular weight.

One of the problems encountered with polymeric viscosity index improvers is their tendency to thicken mineral oils at low temperatures. In general, lower molecular weight polymers have a reduced tendency to thicken oils at low temperatures and in some cases may even improve their low-temperature properties.

Another problem frequently encountered with polymeric viscosity index improvers is their lack of shear stability. Shear stability is a measure of the tendency of the oil-polymer composition to become less viscous after prolonged use under high-shear conditions. This loss in the viscosity is believed to be due to a reduction in the molecular weight of the polymer. It is known that low molecular weight polymers tend to be more shear stable than their higher molecular weight counterparts.

Thus, the molecular weight of polymeric viscosity index improvers is generally a compromise between a high enough molecular weight to give good thickening power and a low enough molecular weight to give good shear stability and reduced tendency to increase the viscosity of the oil at low temperatures. Italian Pat. 811,873 granted May 2, 1968, and corresponding French Pat. 1,537,571 granted July 15, 1968, disclose viscosity index improvers which impart to neutral mineral oils an improved combination of viscosity properties including viscosity index, thickening power, low temperature properties and shear stability. The disclosed oil compositions comprise a neutral mineral oil and, as viscosity index improver, an effective amount of an oil-soluble hydrocarbon copolymer containing about 25 to 75 weight percent polymerized comonomer units, said comonomer selected from the group consisting of terminally unsaturated straight chain monoolefins of 3 to 14 carbon atoms, $\omega$-phenyl 1-alkenes of 9 to 10 carbon atoms, 2-norbornene, terminally unsaturated non-conjugated diolefins of 5 to 8 carbon atoms, dicyclopentadiene, 5-methylene - 2 - norbornene, and mixtures thereof, said copolymer having a pendent index of about 4 to 33, an average pendent size not exceeding 10 carbon atoms and an average chain length of 2,700 to 8,800 carbon atoms.

In current commercial petroleum operations, it is the practice to incorporate various additives into lubricants and fuels to improve viscosity-temperature characteristics, corrosion inhibition, sludge inhibition, sludge dispersancy, antioxidation, metal deactivation, pour point depression and the like.

When subjected to low temperatures, lubricating oils generally solidify. Depending upon the nature of the oil, the solidification is often accompanied by the formation of wax crystals which may trap a large volume of oil. It is, therefore, common practice to add a pour point depressant to oils which may be subjected to low temperatures. There are several types of pour point depressants commonly used in industry at the present time: (a) condensation products of a chlorinated paraffin wax and naphthalene, (b) condensation products of tetraparaffinphenol, (c) polyalkylmethacrylates, (d) copolymers of an alkylaminoalkylmethacrylate and an alkylmethacrylate, and (e) polyalkylacrylates. The amount of pour point depressant added to the oil generally is about 0.1 to 10 weight percent, most often, 0.3 to 5 weight percent.

It has been discovered that some of the viscosity index-improving hydrocarbon copolymers of the aforesaid Italian and French patents have an adverse effect on pour point depressant additives. There is a need, therefore, for viscosity index improvers which do not adversely affect pour point depressants when both are added to neutral mineral oils.

DESCRIPTION OF THE INVENTION

The present invention resides in improved mineral oil compositions comprising a neutral, non-volatile, mineral oil, a pour point depressant and a viscosity index improver consisting of an oil-soluble, substantially linear, hydrocarbon copolymer containing, on a weight basis, 25 to 55% polymerized ethylene units and 75 to 45% polymerized comonomer units, said comonomer selected from the group consisting of terminally unsaturated straight chain monoolefins of 3 to 12 carbon atoms, ω-phenyl-1-alkenes of 9 to 10 carbon atoms, 2-norbornene, terminally unsaturated non-conjugated diolefins of 5 to 8 carbon atoms, dicyclopentadiene, 5-methylene-2-norbornene, and mixtures thereof, said copolymer having a pendent index of about 18 to 33, an average pendent size not exceeding 10 carbon atoms, an average chain length of 2,700 to 8,800 carbon atoms and an inherent viscosity of about 0.7 to 1.8 as measured on a 0.1 weight percent solution in tetrachloroethylene at 30° C.

The ethylene copolymers used as viscosity index improvers in accordance with this invention impart an outstanding combination of improved viscosity properties to neutral oils containing them, and further, can be used in considerably smaller amounts than the most widely accepted viscosity index improvers in present commercial practice. Still further, they do not adversely influence the effectiveness of pour point depressant oil additives, and they permit the formulation of mineral oil compositions having an overall combination of viscosity index, low temperature viscosity and shear stability properties superior to those provided by widely accepted commercial viscosity index improvers.

The copolymers used in the present invention are oil-soluble copolymers derived from ethylene and comonomers selected from the group consisting of terminally unsaturated straight chain monoolefins of 3 to 12 carbon atoms, ω-phenyl-1-alkenes of 9 to 10 carbon atoms, 2-norbornene, terminally unsaturated non-conjugated diolefins of 5 to 8 carbon atoms, dicyclopentadiene, 5-methylene-2-norbornene, and mixtures thereof. Suitable terminally unsaturated straight chain monoolefins of 3 to 12 carbon atoms include propylene, 1-butene, 1-pentene, 1-hexene, 1-heptene, 1-octene, 1-nonene, 1-decene and 1-dodecene. Suitable ω-phenyl-1-alkenes of 9 to 10 carbon atoms are 3-phenyl - 1 - propene and 4-phenyl-1-butene. Suitable terminally unsaturated non-conjugated diolefins of 5 to 8 carbon atoms include 1,4-pentadiene, 1,4-hexadiene, 1,5-hexadiene, 2-methyl-1,5-hexadiene, 1,6-heptadiene and 1,7-octadiene.

Generally, the copolymers used in accordance with this invention are derived, on a weight basis, about 25 to 55% from ethylene, about 35 to 75% from propylene and up to 10% from 1,4-hexadiene. Preferably, the copolymers are derived about 40 to 53% from ethylene, about 42 to 59% from propylene and about 1 to 5% from 1,4-hexadiene. Most preferably, the copolymer contains 50.5% by weight ethylene, 46% by weight propylene and 3.5% by weight 1,4-hexadiene.

In order to have copolymers which do not interfere with the action of the pour point depressant in the oil composition, it has been discovered that the amount of ethylene must be within the limits expressed in weight percent as above. The limits can be expressed in mol percent; for example, the mol percent; for example, the mol percent is shown in the following equation and table for copolymers derived from ethylene (25 to 55%) and propylene (75 to 45%), and from ethylene (25 to 55%), propylene (74 to 35%) and 1,4-hexadiene (1 to 10%).

mol percent E $$= \frac{\frac{\text{wt. percent E}}{28.1}}{\frac{\text{wt. percent E}}{28.1} + \frac{\text{wt. percent P}}{42.1} + \frac{\text{wt. percent HD}}{82.1}}$$

$$= \times 100 = 33.3 \text{ to } 67.25$$

TABLE I.—COMPOSITION OF ETHYLENE/PROPYLENE AND ETHYLENE/PROPYLENE/1,4-HEXADIENE COPOLYMERS USEFUL HEREIN

|  | E/P copolymer | | | E/P/HD copolymer | | | Preferred | | |
|---|---|---|---|---|---|---|---|---|---|
|  | Weight percent | Mols | Mol percent | Weight percent | Mols | Mol percent | Weight percent | Mols | Mol percent |
| E ──────── a | 25 ↑ | 0.89 | 33.3 | 25 ↑ | 0.89 | 33.45 |  |  |  |
| MW=28.1 ──── b | 55 | 1.96 | 64.7 | 55 | 1.96 | 67.25 | 50.5 | 1.80 | 61.29 |
| P ──────── a | 75 ↑ | 1.78 | 66.7 | 74 ↑ | 1.76 | 66.09 |  |  |  |
| MW=42.1 ──── b | 45 | 1.07 | 35.3 | 35 | 0.83 | 28.57 | 46.0 | 1.09 | 37.26 |
| 1,4-HD ──── a |  |  |  | 1 ↑ | .01 | 0.46 |  |  |  |
| MW=82.1 ──── b |  |  |  | 10 | 0.12 | 4.18 | 3.5 | 0.04 | 1.45 |

The ethylene copolymers useful in the practice of this invention, that is, those copolymers which do not interfere with the action of a pour point depressant also present in the formulated composition, contain a weight percent range of ethylene of 25 to 55%, or 33.3 to 67.25 mol percent.

The ethylene copolymers which are used in the present invention contain a specific number of pendent groups attached to the carbon backbone of the polymer. The number of pendent groups, or branch chains, is expressed as the "pendent index" or "branch index," a widely used term which is defined as the number of non-terminal pendent groups or branch chains, such as alkyl, alkenyl, cycloalkenyl and phenylalkyl, per 100 carbon atoms of the polymer backbone (see, for example, U.S. Pat. No. 3,166,387).

The pendent index of the ethylene copolymers used herein ranges from 18 to 33; this range is achieved by controlling the composition of the copolymer employed. For example, an ethylene-propylene copolymer containing 25 weight percent ethylene and 75 weight percent propylene contains 33.3 mol percent ethylene and 66.7 mol percent propylene, or two mols of propylene for every one mol of ethylene. Such a copolymer contains two methyl groups for every six carbon atoms in the polymer backbone, or 33 methyl groups per 100 carbon atoms, and has a pendent index, or branch index, of 33. When the pendent index is greater than about 33, poor shear stability may be encountered depending upon the average chain length. Preferably, the pendent index is about 18–30.

The ethylene copolymers have an average pendent size not exceeding 10 carbon atoms. The term "average pendent size" is used to indicate the number of carbon atoms in an average size pendent group. Preferably, the pendent size is about 1–6 carbon atoms. The size is governed by the nature of the comonomer used with ethylene. As can be seen from the above description of applicable comonomers, the pendent group will not exceed 10 carbon atoms.

The ethylene copolymers useful in the practice of this invention have average chain lengths of about 2,700 to 8,800 carbon atoms, preferably 4,200 to 8,500 carbon atoms. The term "average chain length" is used to indicate the average number of carbon atoms in the backbone of the polymer chain as determined by light scattering. It has been discovered that the average chain length correlates with the thickening power of the polymer. When the average chain length of the polymer is less than about 2,700 the thickening power of the polymer drops abruptly. At average chain lengths above about 9,000, the shear stabilities of the oil-polymer compositions are inferior.

The ethylene copolymers used herein have inherent viscosities of about 0.7 to 1.8, measured as a 0.1% by weight solution of polymer in tetrachloroethylene at 30° C. The preferred copolymers have inherent viscosities of about 1.1 to 1.7. A definition of inherent viscosity is given in the Journal of Colloid Science, 1, 261–269 (1946). It is expressed as ln$Nr/c$, wherein ln is the natural logarithm, $Nr$ is the viscosity of the solution relative to the viscosity of the solvent and $c$ is the concentration expressed in grams of solute/100 ml. of solvent. Inherent viscosity is indicative of the molecular weight of the polymer. Inherent viscosities of 0.7 to 1.8 correspond to about 45,000 to 140,000 weight average molecular weights, as determined by light scattering, while the preferred range of 1.1 to 1.7 corresponds to molecular weights of about 80,000 to 130,000.

Optimum performance is achieved with ethylene copolymers within the specified average chain length range and molecular weight range which have a relatively narrow molecular weight distribution. Preferably, the molecular weight distribution, which is determined by dividing the weight average molecular weight by the number average molecular weight, is less than about 8.

The copolymers which are used herein are the essentially amorphous, oil soluble, hydrocarbon copolymers of ethylene and are prepared by polymerization in the presence of coordination catalysts. Polymerization with this type of catalyst is well known (see, for example, U.S. Patent Nos. 2,799,668, 2,933,480 and 2,975,159). Since the utilization of these catalysts can produce a variety of types of polymers from ethylene and, for example, propylene, it is important to control the conditions of the reaction in order to obtain the requisite amorphous polymers having the specified molecular weights and narrow molecular weight distributions.

More specifically, in order to obtain the amorphous copolymers, it is advantageous to use a hydrocarbon-soluble vanadium compound, for example, vanadium triacetylacetonate, in combination with an alkyl aluminum chloride as described in U.S. Patent No. 3,300,459 and in J. Polymer Science, 51, 411ff and 429ff (1961). Use of this catalyst system results in the formation of an essentially amorphous copolymer which is soluble in a neutral mineral oil. Since such copolymers exhibit no substantial crystallinity as evidenced by X-ray examination, a more precise measure of the amorphous character of the polymer is the aforesaid solubility. The control of molecular weight and/or molecular weight distribution can be effected by the methods disclosed in J. Polymer Science, 34, 531ff (1959), for example, by the use of chain transfer agents such as metal alkyls, especially zinc alkyls, or in U.S. Patent No. 3,051,690, for example, by the use of hydrogen.

As is well known, the aforesaid catalysts must be used in the strict absence of oxygen, water or other materials with which they react. For this reason, the solvents in which they are used are greatly limited, the preferred ones being the saturated aliphatic and hydroaromatic hydrocarbons and certain non-reactive halogen compounds such as tetrachloroethylene or a liquid chlorobenzene. Such solvents also serve as polymerization media, the polymerization usually being carried out in a dilute suspension of the catalyst at normal temperatures and pressures, although elevated or reduced temperatures and pressures also can be used.

The neutral mineral oil used as the base oil of the compositions of this invention can be a lubricating oil, such as the normally used crankcase oils, or a functional fluid, such as automotive transmission fluids and hydraulic fluids. By "neutral oil" is meant a non-volatile mineral oil which has been refined to remove its acidic and alkaline content, generally by solvent extraction. Solvent extraction can also be used to reduce the paraffin or naphthene content of these oils. The mineral oil can be derived from paraffinic or naphthenic base petroleum, shale oil and the like.

Lubricating oil and transmission fluid base oils are predominantly paraffinic, solvent-refined neutral oils having Saybolt Universal Seconds (S.U.S.) viscosities of about 60 to 220 at 100° F. and viscosity indices of about 80 to 110. Lubricating oils preferably have S.U.S. viscosities of about 90 to 160, while transmission fluids preferably have S.U.S. viscosities of about 60 to 110. Hydraulic fluid base oils are predominantly naphthenic, solvent-refined neutral oils having S.U.S. viscosities not greater than about 50 and pour points not above about −65° F.

The ethylene copolymer can be incorporated into the base oil by first milling or blending the polymer into a small portion of mineral oil to form a concentrate which is then blended into the base oil to the desired concentration. Suitable oils for forming the concentrate are paraffinic, naphthenic and mixed neutral oils of 70 to 150 S.U.S. viscosity at 100° F.; such oils are commonly used as solvents or diluents for polymer concentrates. The solution time can be decreased by preheating the oil to 170° to 210° F. before milling or blending with the polymer. The polymer concentrate can conveniently contain about 5–15% by weight of polymer. The polymer can also be dissolved in the base oil by a solvent transfer technique, whereby the polymer is first dissolved in a volatile solvent, such as carbon tetrachloride, trichloroethylene or n-hexane. The solution is then mixed with the base oil and the solvent is removed by distillation.

The effective amount of ethylene copolymer used in the final oil composition is dependent upon the base oil viscosity. Generally, it will be in the range of about 0.3 to 3% by weight, and preferably, about 1 to 2% by weight.

The effective amount of pour point depressant, of a type previously described in the discussion of the prior art, generally is in the range 0.1 to 10 weight percent, preferably 0.3 to 5 weight percent, of the oil composition.

The oil compositions of this invention may also contain other types of additives usually compounded into neutral oil compositions, such as anti-oxidants, basic detergents, corrosion inhibitors, rust inhibitors, extreme pressure additives and dyes. The ethylene copolymers used in accordance with this invention are generally compatible with these types of additives.

The following examples, illustrating the compositions of this invention, are given without any intention that the invention be limited thereto. Throughout these examples viscosities were measured in accordance with American Society for Testing Materials (ASTM) Test Method D 445. All percentages are by weight except where otherwise specified.

Example 1

An ethylene/propylene/1,4-hexadiene terpolymer was prepared as follows:

Tetrachloroethlyene solvent (500 ml.) was cooled to 0° C. in a flask equipped with a stirrer, gas delivery tube, thermometer and serum cap. The solvent was saturated with a mixture of ethylene, propylene, nitrogen and hydrogen gases at flow rates of 2.0, 1.5, 0.5 and 0.1 liters per minute, respectively. Then 2.9 ml. (0.05 mole) of 1,4-hexadiene was added, followed by 5 ml. of a 1.0 molar solution of diisobutylaluminum chloride in tetrachloroethylene and then 5 ml. of a 0.10 molar solution of vanadium trisacetylacetonate in benzene, each of these being introduced with a hypodermic syringe. The mixture was stirred at 0° C. for 20 minutes and then the catalyst was destroyed by adding 10 ml. of a 1% solution of 4,4′-butylidene-bis-(6-tert.butyl-3-methyl phenol) in isopropanol. The reaction mixture was extracted with an equal volume of 5% hydrochloric acid in a high speed mixer and washed with two 500 ml. portions of water. The solvent was allowed to evaporate in an open pan and the polymer residue was vacuum dried for 24 hours at 75° C. and 20 mm. Hg pressure. The yield was 25 g. of ethylene/propylene/1,4-hexadiene terpolymer.

The composition of the terpolymer was determined as follows. The propylene content was found to be 45.1% by comparison of the 8.67 to 2.35 micron infrared absorbance ratio with a calibration curve which related this ratio to the propylene content. The calibration curve was established using radioactive-carbon tagged polymers. The bromine equivalent showed the polymer contained 2.6% unsaturated hexadiene. Applying the 10.36 to 2.35 and 8.67 to 2.34 micron infrared absorbance ratios to a calibration equation gave a total hexadiene content of 3.9%. The inherent viscosity of the terpolymer, measured as a 0.1% solution in tetrachloroethylene at 30° C., was 1.26.

The additional copolymers listed in Tables II and III hereinbelow were prepared and analyzed in a similar manner.

Additive concentrates of these copolymers were prepared as follows: Twelve gallons (90 lbs.) of a paraffinic, solvent-refined, neutral oil of 73 S.U.S. viscosity and a viscosity index of 100 were charged into a 25 gallon capacity Duolater milling apparatus at room temperature. Twelve pounds of copolymer, cut into one-inch cubes, were added. The mixture was milled for about 30 minutes, after which a clear solution resulted, and then for 10 additional minutes.

The following tests were carried out using additive concentrates of the ethylene copolymers listed in Tables II and III.

Thickening power.—The thickening powers of various ethylene copolymers were determined by measuring the viscosity in centistokes at 100° F. of oil compositions containing a solvent-refined neutral oil having a S.U.S. viscosity of 220 at 100° F. and a viscosity index of 98 as the base oil and sufficient viscosity index improver concentrate to provide a copolymer concentration of 3%. For comparison, a commercial polyisobutylene polymer, designated "Commercial Polymer A," and a commercial polymethacrylate polymer, designated "Commercial Polymer B," the most widely used commercial viscosity index improvers, were also tested.

Viscosity index.—Viscosity index was determined in accordance with ASTM Test Method D 567 by measuring the viscosity at 100° F. of oil compositions containing as the base oil a solvent-refined neutral oil having a S.U.S. viscosity of 107 at 100° F. and a viscosity index of 96, a solvent-refined neutral oil having a S.U.S. viscosity of 130 at 100° F. and a viscosity index of 97 or a blend of the two, and the amount of various ethylene copolymers necessary to give the oil composition a viscosity of 11.5±0.1 centistokes at 210° F. Viscosity index was not affected by the variation in viscosity of the base oil since in all cases the base oil had a viscosity index of 96 to 97. Higher viscosity indices indicate reduced temperature sensitivity of the oil composition.

Weight for equal thickening.—Weight for equal thickening was determined by measuring the amount of various ethylene copolymers necessary to increase the viscosity of the same base oil as used in the viscosity index determination to 11.5±0.1 centistokes at 210° F. This amount was then compared with the amount of Commercial Polymer A necessary to accomplish the same result with the same base oil in each case. The amount of Commercial Polymer A was arbitrarily assigned a value of 1.0 and the amount of ethylene copolymer was expressed as a fraction thereof.

Viscosity at 0° F.—The apparent viscosities at 0° F. of oil compositions containing the same base oil as in the viscosity index test and the amount of various ethylene copolymers necessary to give the oil composition a viscosity of 11.5±0.1 centistokes at 210° F. were measured using a cold cranking simulator. In this test, a universal motor, run at constant voltage, drives a rotor which is closely fitted inside a stator. A small sample of the oil composition fills the space between the rotor and stator which are maintained at 0° F. The speed of the rotor is a function of, and is calibrated to determine, the viscosity of the oil composition in poises. Comparisons with the aforesaid Commercial Polymers A and B were run using the same base oils.

Shear stability.—The shear stabilities of oil compositions containing the same base oil as in the viscosity index test and the amount of various ethylene copolymers necessary to increase the viscosity of the oil composition to 11.5±0.1 centistokes at 210° F. were determined using a 250 watt, 10 kilocycle, magnetostrictive, sonic oscillator in accordance with the technique described in "Proposed Method of Test for Shear Stability of Polymer-Containing Oils," in ASTM Standards, vol. I, page 1160 (October 1961). The procedure was modified by shearing a 50 ml. sample for 60 minutes at 100° F. at 0.6 r.F. ampere. Shear stability is expressed as the average percent retention of viscosity in centistokes at 210° F. and 100° F. Comparisons with Commercial Polymers A and B were run using the same base oils.

Tables II and III show the improved viscosity properties and the surprising shear stabilities of the ethylene copolymer-containing lubricant compositions of this invention. For comparison, data for oil compositions containing the aforesaid Commercial Polymer A and Commercial Polymer B are given in Table IV.

TABLE II.—ETHYLENE/PROPYLENE/1,4-HEXADIENE COPOLYMERS

| Copolymer Weight ratio | Average chain length | Thickening power | Base oil viscosity, S.U.S. at 100° F. | Viscosity index | Wt. for equal thickening | Viscosity at 0° F., poises | Shear stability percent |
|---|---|---|---|---|---|---|---|
| Ethylene/propylene/HD: | | | | | | | |
| 41.8/54.7/3.5 | 6,700 | | 107 | 140 | 0.52 | 11.5 | 81 |
| 53.1/40.8/6.1 | 6,000 | | 107 | 139 | 0.60 | 10.5 | 85 |
| 50.7/46.8/2.5 | 6,000 | | 107 | 142 | 0.56 | | 85 |
| 54.3/44/1.7 | 6,000 | | 107 | 144 | 0.56 | 6.0 | 85 |
| 55.3/41.0/3.7 | 5,600 | 268 | | | | | |
| 50.1/46.1/3.8 | 5,500 | | 110 | 135 | 0.56 | 10.2 | 84 |
| 51/45.1/3.9 | 5,500 | | 107 | 144 | 0.62 | 9.6 | 86 |
| 51.8/45/3.2 | 5,200 | 260 | | | | | |
| 29.3/67.7/3 | 5,000 | | 107 | 135 | 0.69 | 9.6 | 85 |
| 42.5/54.4/3.1 | 4,900 | | 107 | 135 | 0.69 | 15.8 | 86 |

TABLE III.—ETHYLENE COPOLYMERS

| Copolymer Weight ratio | Average chain length | Base oil Viscosity, S.U.S. at 100° F. | Viscosity index | Wt. for equal thickening | Viscosity at 0° F., poises | Shear stability percent |
|---|---|---|---|---|---|---|
| Ethylene/propylene: | | | | | | |
| 42/58 | 7,100 | 107 | 140 | 0.48 | 10.2 | 73 |
| 33/67 | 6,900 | 107 | 140 | 0.62 | 11.6 | 83 |
| 44/56 | 5,500 | 107 | 143 | 0.59 | 10.4 | 84 |
| 27/73 | 5,400 | 107 | 141 | 0.64 | ---------- | 82 |
| Ethylene/hexene: 32/68 | 3,200 | 107 | 143 | 0.72 | ---------- | 81 |

TABLE IV.—COMPARATIVE DATA

| Commercial polymer* | Thickening power | Base oil Viscosity, S.U.S. at 100° F. | Viscosity index | Weight for equal thickening | Viscosity at 0° F., poises | Shear stability, percent |
|---|---|---|---|---|---|---|
| A | 142 | 107 | 138 | 1.00 | 14.1 | 77 |
| A | 142 | 110 | 138 | 1.00 | 14.1 | 77 |
| A | 142 | 122 | 138 | 1.00 | 14.3 | 77 |
| A | 142 | 126 | 138 | 1.00 | 14.4 | 77 |
| A | 142 | 131 | 138 | 1.00 | 14.5 | 77 |
| B | 157 | 131 | 157 | 1.03 | 10.7 | 62 |

*A="Paratone" N, Enjay Chemical Co.; B="Acryloid" 966, Rohm and Haas Chemical Co.

Example 2

The in-use performance and compatibility of several ethylene copolymers prepared and analyzed as indicated in Example 1 were determined as follows:

Lubricant compositions were prepared containing a base oil, an amount of various polymer concentrates, prepared as in Example 1, necessary to give a viscosity of 11.5±0.1 centistokes at 210 F., 4% polyaminomonoalkenylsuccinimide, designated Additive X, 1% zinc dialkyldithiophosphate, designated Additive Y, and 2% basic calcium sulfonate, designated Additive Z. The base oil was a blend of refinery components having a S.U.S. viscosity of 107 at 100 F., and a viscosity index of 97 and containing 20 to 25% by volume aromatics, 10 to 20% by volume olefins, 55 to 65% by volume saturates, 0.21 to 0.25% by weight sulfur and 2.5 to 3 ml. tetraethyl lead per million gallons. The lubricant compositions were tested in a single-cylinder CLR engine operated for 180 hours to determine in-use performance of the polymers and their compatibility with the other additives. The used lubricant compositions were periodically removed from the engine, topped to remove gasoline dilution, centrifuged to settle out any insoluble matter, and analyzed to determine viscosities at 210° and 100° F.

The following Table V shows the changes in viscosity of compounded oils containing an ethylene copolymer compared with the same compounded oils containing the aforesaid Commercial Polymer A.

could otherwise react with the reactive oxidation intermediates to form polymer adducts with accompanying viscosity increases.

Example 3

The significance of the use of the specific copolymers of this invention in the presence of pour point depressants is demonstrated by this example. The example includes polymers whose compositions fall within those of the aforesaid Italian and French patents (but outside the present invention). Such copolymers are unsatisfactory as viscosity index improvers because of their adverse effect on pour point depressant additives.

The method used to determine the pour point of the lubricant was ASTM Method D 97. A sufficient amount of polymer (as a concentrate) was dissolved in the oil to give a viscosity of the oil blend of between 11 and 12 centistokes at 210° F. To each blend was added a commercial pour point depressant and the pour point of the blend was then measured.

Tables VI and VII show the results of the pour point determinations. Sample Nos. 16 to 19 show the adverse effect of copolymers outside the requisite composition range on the pour point depressant. Pour point depressants C and D are of the chlorinated paraffin wax-naphthalene condensation type. Pour point depressants E, F and G are polyalkylmethacrylates. H is a condensation product of tetraparaffin-phenol and I is a copolymer of an alkylaminoalkyl methacrylate and an alkyl methacrylate. The

TABLE V.—PERFORMANCE AND COMPATIBILITY TEST

| Copolymer Weight ratio | Average chain length | Other additives | Temp., °C. | Viscosity, centistokes after— | | | |
|---|---|---|---|---|---|---|---|
| | | | | 0 hr. | 60 hrs. | 120 hrs. | 180 hrs. |
| Ethylene/propylene/hexadiene: 51.8/45/3.3 | 5,200 | X+Y | 100 | 71.9 | 64.9 | 72.3 | 78.7 |
| | | X+Y | 210 | 11.5 | 10.2 | 10.7 | 11.5 |
| | | X+Y+Z | 100 | 72.6 | 67.3 | 72.7 | 108.5 |
| | | X+Y+Z | 210 | 11.6 | 10.7 | 11.4 | 18.2 |
| Commercial polymer A | | X+Y | 100 | 69.2 | 61.5 | 89.6 | 144.3 |
| | | X+Y | 210 | 11.4 | 9.7 | 12.1 | 20.1 |
| | | X+Y+Z | 100 | 71.3 | 65.5 | 117.4 | 194.9 |
| | | X+Y+Z | 210 | 11.6 | 10.5 | 20.2 | 25.6 |

From the foregoing table it can be seen that the viscosity of the compounded oils containing Commercial Polymer A are thickened considerably after 180 hours, while the compounded oils containing the ethylene copolymers do not exhibit any appreciable thickening. Viscosity increases during prolonged use are generally attributed to oxidation of the oils, producing reactive intermediates. The fact that oils containing the ethylene copolymers do not thicken may be explained by the greater shear stability and thickening power of the copolymers, whereby polymer fragments are not produced which aforesaid pour point depressants are further identified as follows:

C: "Paraflow" 149, Enjay Chemical Co.;
D: "Paraflow" 46, Enjay Chemical Co.;
E: "Acryloid" 150, Rohm and Haas Chemical Co.;
F: "Acryloid" 732, Rohm and Haas Chemical Co.;
G: "Acryloid" 917, Rohm and Haas Chemical Co.;
H: "Santopour" C, Monsanto Chemical Co.;
I: LOA 564, E. I. du Pont de Nemours and Co.

TABLE VI.—POUR POINT RESPONSE OF PETROLEUM BASE LUBRICATING OILS CONTAINING POUR POINT DEPRESSANTS AND ETHYLENE/PROPYLENE/1,4-HEXADIENE COPOLYMERS

| Sample No. | Copolymer characterization | | | | | Base oil [1] | Wt. percent copolymer in oil blend | ASTM D-97 pour point of oil blend, °F. (pour point depressant [2]) | |
|---|---|---|---|---|---|---|---|---|---|
| | Wt. percent monomer | | | Mol percent ethylene | $\eta_{inh}$ | | | C | D |
| | E | P | HD | | | | | | |
| 1 | 40.6 | 56.0 | 3.4 | 51.2 | 1.68 | a | 1.09 | −30 | |
| 1a | 40.6 | 56.0 | 3.4 | 51.2 | 1.68 | b | 1.09 | | −30 |
| 2 | 43.4 | 54.0 | 2.6 | 54.0 | 1.71 | a | 1.08 | −30 | |
| 3 | 46.9 | 49.0 | 4.1 | 58.0 | 1.52 | a | 1.18 | −30 | |
| 3a | 46.9 | 49.0 | 4.1 | 58.0 | 1.52 | b | 1.18 | | −35 |
| 4 | 50.7 | 46.0 | 3.3 | 61.4 | 1.66 | a | 1.10 | −30 | |
| 4a | 50.7 | 46.0 | 3.3 | 61.4 | 1.66 | b | 1.10 | | −30 |
| 5 | 51.4 | 45.0 | 3.6 | 62.2 | 1.75 | a | 1.06 | −30 | |
| 5a | 51.4 | 45.0 | 3.6 | 62.2 | 1.75 | b | 1.06 | | −25 |
| 6 | 51.8 | 45.0 | 3.2 | 62.4 | 1.20 | a | 1.12 | −25 | |
| 6a | 51.8 | 45.0 | 3.2 | 62.4 | 1.20 | b | 1.12 | −25 | |
| 6b | 51.8 | 45.0 | 3.2 | 62.4 | 1.20 | c | 1.12 | −20 | |
| 6c | 51.8 | 45.0 | 3.2 | 62.4 | 1.20 | c | 1.12 | | −35 (0.3) |
| 7 | 53.6 | 42.0 | 4.4 | 64.4 | 1.72 | a | 1.05 | −30 | |
| 8 | 53.7 | 42.0 | 4.3 | 64.5 | 1.73 | a | 1.05 | −30 | |
| 9 | 54.5 | 41.0 | 4.5 | 65.3 | 1.68 | a | 1.08 | −30 | |
| 10 | 54.5 | 41.0 | 4.5 | 65.3 | 1.73 | a | 1.05 | −30 | |
| 11 | 54.9 | 41.0 | 4.1 | 65.6 | 1.72 | a | 1.05 | −30 | |
| 12 | 54.9 | 41.0 | 4.1 | 65.6 | 1.75 | a | 1.04 | −30 | |
| 13 | 54.2 | 42.0 | 3.8 | 64.8 | 1.51 | a | 1.18 | −10 | |
| 13a | 54.2 | 42.0 | 3.8 | 64.8 | 1.51 | b | 1.18 | | −20 |
| 14 | 55.6 | 39.9 | 4.5 | 66.3 | 1.76 | c | 0.73 | −20 | −15 |
| 15 | 55.7 | 40.1 | 4.2 | 66.4 | 1.65 | a | 1.10 | −30 | |
| 15a | 55.7 | 40.1 | 4.2 | 66.4 | 1.65 | c | 1.10 | −25 | |
| 15b | 55.7 | 40.1 | 4.2 | 66.4 | 1.65 | c | 1.10 | −20 (0.3) | |
| 16 | 58.2 | 39.0 | 2.8 | 68.3 | 1.62 | a | 1.12 | −10 | |
| 16a | 58.2 | 39.0 | 2.8 | 68.3 | 1.62 | b | 1.12 | | −5 |
| 17 | 58.4 | 37.0 | 4.6 | 68.9 | 1.54 | a | 1.16 | −5 | |
| 18 | 60.0 | 36.0 | 4.0 | 70.4 | 1.70 | a | 1.08 | −5 | |
| 19 | 61.3 | 35.0 | 3.7 | 71.2 | 1.48 | a | 1.2 | −5 | |
| 19a | 61.3 | 35.0 | 3.7 | 71.2 | 1.48 | b | 1.2 | | −5 |
| 20 | | | | | | a | | −30 | −30 |
| 20a | | | | | | b | | | −30 |
| 20b | | | | | | c | | −30 | |

[1] Base oil: a=130 S.U.S./100° F., V.I. 97, Solvent Refined Neutral, pour point=−5° F.; b=172 S.U.S./100° F., V.I. 101, Solvent Refined Neutral plus Commercial Proprietary Lube Oil Additive Pkg., pour point=+5° F.; c=Mixture of 100 S.U.S./100° F., V.I. 100, Solvent Refined Neutral and 1370 S.U.S./100° F., V.I. 100, Bright Stock plus Commercial Proprietary Lube Oil Additive Pkg., pour point=0° F.

[2] Pour point depressant: percent in parenthesis if other than 0.5 wt. percent.

TABLE VII.—POUR POINT RESPONSE OF PETROLEUM BASE LUBRICATING OILS CONTAINING POUR POINT DEPRESSANTS AND ETHYLENE/PROPYLENE OR ETHYLENE/PROPYLENE/1,4-HEXADIENE COPOLYMERS

| Sample No. | Copolymer characterization | | | | | Base oil [1] | Weight percent copolymer in oil blend | ASTM D-97 pour point of oil blend, °F. (pour point depressant)[2] | | | | |
|---|---|---|---|---|---|---|---|---|---|---|---|---|
| | Weight percent monomer | | | Mol percent ethylene | $\eta_{inh}$ | | | E | F | G | H | I |
| | E | P | HD | | | | | | | | | |
| 1 | 39.0 | 61.0 | 0 | 48.9 | 1.62 | a | 1.12 | −25 | | | | |
| 2 | 51.8 | 45.0 | 3.2 | 62.4 | 1.20 | a | 1.12 | −25 | | | | |
| 2a | 51.8 | 45.0 | 3.2 | 62.4 | 1.20 | b | 1.12 | −25 | | | | |
| 2b | 51.8 | 45.0 | 3.2 | 62.4 | 1.20 | c | 1.12 | −25 | | | −25 | |
| 2c | 51.8 | 45.0 | 3.2 | 62.4 | 1.20 | d | 1.66 | −20 | | | | |
| 3 | 55.6 | 39.9 | 4.5 | 66.3 | 1.76 | c | 0.73 | −20 | | | −15 | |
| 3a | 55.6 | 39.9 | 4.5 | 66.3 | 1.76 | d | 0.80 | | −20 (1.2) | −25 (1.08) | −15 (1.08) | |
| 3b | 55.6 | 39.9 | 4.5 | 66.3 | 1.76 | d | 1.09 | −15 | | | | |
| 4 | 61.3 | 35.0 | 3.7 | 71.2 | 1.48 | d | 1.0 | | −5 (1.2) | −5 (1.08) | −5 (1.08) | |
| 4a | 61.3 | 35.0 | 3.7 | 71.2 | 1.48 | a | 1.2 | −5 | | | | |
| 4b | 61.3 | 35.0 | 3.7 | 71.2 | 1.48 | d | 1.2 | −5 | | | −5 | |
| 5 | | | | | | a | | −30 | | | | |
| 5a | | | | | | d | | | −30 (1.2) | −30 (1.08) | −40 (1.08) | |

[1] Base oil: a=130 S.U.S./100° F., V.I. 97, Solvent Refined Neutral, pour point=−5° F.; b=172 S.U.S./100° F., V.I. 101, Solvent Refined Neutral plus Commercial Proprietary Lube Oil Additive Pkg., pour point=+5° F.; c=Mixture of 100 S.U.S./100° F., V.I. 100, Solvent Refined Neutral and 1370 S.U.S./100° F., V.I. 100, Bright Stock plus Commercial Proprietary Lube Oil Additive Pkg., pour point=0° F.; d=170 S.U.S./100° F., V.I. 100, Solvent Refined Neutral, containing detergent and inhibitor additives, pour point=−5° F.

[2] Pour point depressant: percent in parenthesis if other than 0.5 wt. percent.

The embodiments of the invention in which an exclusive property or privilege is claimed are defined as follows:

1. In an oil composition which comprises a neutral mineral oil base, an effective amount of a polymeric pour point depressant and an effective amount of a viscosity index improver, the improvement which comprises utilizing as the viscosity index improver an oil-soluble, substantially linear, hydrocarbon copolymer containing, on a weight basis, 25 to 55% polymerized ethylene units and 75 to 45% polymerized comonomer units, said comonomer selected from the group consisting of (a) terminally unsaturated straight chain monoolefins of 3 to 12 carbon atoms,
(b) ω-phenyl-1-alkenes of 9 to 10 carbons atoms,
(c) 2-norbornene,
(d) terminally unsaturated non-conjugated diolefins of 5 to 8 carbon atoms,
(e) dicyclopentadiene, and
(f) 5-methylene-2-norbornene, and mixtures thereof, but no more than one comonomer from any single subgroup, said copolymer having a pendent index of 18 to 33, an average pendent size not exceeding 10 carbon atoms, an average chain length of 2,700 to 8,800 carbon atoms, an inherent viscosity of 0.7 to 1.8 as measured on a 0.1 weight percent solution in tetrachloroethylene at 30° C. and a molecular weight distribution of less than 8.

2. The oil composition of claim 1 in which the neutral oil is a predominantly paraffinic, solvent-refined petroleum oil having an S.U.S. viscosity of 60 to 220 at 100° F. and a viscosity index of 80 to 110 or a predominantly naphthenic, solvent-refined, petroleum hydraulic fluid having an S.U.S. viscosity not greater than 50 at 100° F. and a pour point not above −65° F.

3. The oil composition of claim 1 which contains 0.1 to 10 weight percent of pour point depressant and 0.3 to 3% of copolymer which is derived 25 to 55% from ethylene, 35 to 75% from propylene and up to 10% from 1,4-hexadiene, has a pendent index of 18 to 30, an average pendent size of 1 to 6 carbon atoms, an average chain length of 4,200 to 8,500 carbon atoms and an inherent viscosity of 1.1 to 1.7.

4. The oil composition of claim 3 which contains 0.3 to 5 weight percent of pour point depressant and 1 to 2% of copolymer derived 50.5% from ethylene, 46% from propylene and 3.5% from 1,4-hexadiene.

5. The oil composition of claim 3 in which the neutral oil is a lubricating oil having a S.U.S. viscosity of 90 to 160 at 100° F.

6. The oil composition of claim 3 in which the neutral oil is a transmission fluid having a S.U.S. viscosity of 60 to 110 at 100° F.

References Cited

UNITED STATES PATENTS

| | | | |
|---|---|---|---|
| 2,992,987 | 7/1961 | Fields | 252—56 |
| 3,222,332 | 12/1965 | Duck et al. | 252—59 X |
| 3,477,957 | 11/1969 | Hall | 252—59 |
| 3,509,056 | 4/1970 | Shepherd | 252—59 |
| 3,513,096 | 5/1970 | Brownawell et al. | 252—59 |
| 3,522,180 | 7/1970 | Sweeney et al. | 252—59 |
| 3,598,738 | 8/1971 | Biswell et al. | 252—59 |

FOREIGN PATENTS

| | | |
|---|---|---|
| 1,537,571 | 4/1968 | France. |

DANIEL E. WYMAN, Primary Examiner

W. H. CANNON, Assistant Examiner

U.S. Cl. X.R.

252—73